(12) United States Patent
Nakajo

(10) Patent No.: US 6,256,298 B1
(45) Date of Patent: Jul. 3, 2001

(54) MOBILE TELECOMMUNICATION SYSTEM

(75) Inventor: Tomohiko Nakajo, Sagamihara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/059,431

(22) Filed: Apr. 14, 1998

(30) Foreign Application Priority Data

May 16, 1997 (JP) .................................................... 9-143518

(51) Int. Cl.[7] .................................................... H04Q 7/28
(52) U.S. Cl. ........................ 370/328; 370/341; 370/437; 370/493
(58) Field of Search ..................... 370/431, 437, 370/493, 494, 495, 496, 521, 222, 338, 328, 340, 341; 375/240, 241; 379/93.01, 93.08, 220, 229

(56) References Cited

U.S. PATENT DOCUMENTS

| | | | |
|---|---|---|---|
| 5,479,480 | * 12/1995 | Scott | 379/59 |
| 5,781,538 | * 7/1998 | Ganesan et al. | 370/310 |
| 5,812,951 | * 9/1998 | Ganesan et al. | 455/445 |
| 6,112,084 | * 8/2000 | Sicher et al. | 455/426 |

FOREIGN PATENT DOCUMENTS 7-30645   1/1995   (JP) .

* cited by examiner

Primary Examiner—Ricky Ngo
(74) Attorney, Agent, or Firm—Stevens, Davis, Miller & Mosher, LLP

(57) ABSTRACT

A mobile telecommunication system, which transmits a sound signal from a first mobile telecommunication terminal to a second mobile telecommunication terminal over a channel with a predetermined number of bits, includes a first base station to which the first mobile telecommunication terminal and a third terminal which transmits a non-sound signal are connected, and a second base station which is connected to the first base station via a digital network. The second mobile telecommunication terminal is connected to the second base station. The first mobile telecommunication terminal includes a unit which codes and compresses the sound signal to convert the sound signal into a compressed sound signal, and a unit which transmits an answer signal in response to receiving a notice signal which informs that the second mobile telecommunication terminal is the mobile telecommunication terminal. Upon receiving the answer signal from the first mobile telecommunication terminal, the first base station transmits the compressed sound signal and the non-sound signal to the second base station via the digital network by assigning the compressed sound signal to several bits of the channel and assigning the non-sound signal to remaining bits of the channel.

8 Claims, 2 Drawing Sheets

MOBILE TELECOMMUNICATION SYSTEM

BACKGROUND OF THE INVENTION

1. Field of the Invention

The present invention relates to a mobile telecommunication system, and in particular to a mobile telecommunication system in which a sound signal is transmitted after being coded and compressed according to the ADPCM (Adaptive Differential Pulse Code Modulation) scheme.

2. Description of the Related Art

Conventionally, as a mobile telecommunication system in which sound data are transmitted after being coded and compressed according to the ADPCM scheme, there is a personal-handyphone-system transmission system (hereafter referred to as "PHS transmission system") which is disclosed in JP-A-7-30645, for example. The PHS transmission system is used in the communication scheme for transmitting sound and image signals using the S interface of an ISDN (Integrated Services Digital Network). For example, a compressed signal produced by encoding and compressing the sound signal according to the ADPCM scheme is assigned to a first channel 15, which consists of four bits among eight bits of B1 channel (B1-ch) as shown in FIG. 3A, to be transmitted as a signal of 32 kbps. An uncompressed signal (non-sound signal) containing other information is assigned to a second channel 16, which consists of the remaining bits of the B1 channel and eight bits of B2 channel (B2-ch) as shown in FIG. 3B, to be transmitted as a signal of 96 kbps.

In the PHS transmission system, however, it is necessary to use two channels (i.e. the B1 and B2 channels) in order to simultaneously transmit and receive the compressed signal (sound signal) and the uncompressed signal (non-sound signal). Furthermore, in the case where the data amount of the uncompressed signal (non-sound signal) is small, the circuit utilization factor between PHS terminals reduces.

SUMMARY OF THE INVENTION

An object of the present invention is to provide a mobile telecommunication system capable of improving the circuit utilization factor and of simultaneously transmitting and receiving a compressed sound signal and a non-sound signal over one channel.

A first mobile telecommunication system according to the present invention is a mobile telecommunication system for transmitting a sound signal from a first terminal to a second terminal over a channel with a predetermined number of bits, each of the first and second terminals being a mobile telecommunication terminal, which comprises: a first base station to which the first terminal and a third terminal for transmitting a non-sound signal are connected; and a second base station connected to the first base station via a digital network, the second terminal being connected to the second base station, wherein the first terminal comprises: means for coding and compressing the sound signal to convert the sound signal into a compressed sound signal; and means for transmitting an answer signal in response to receiving a notice signal which informs that the second terminal is the mobile telecommunication terminal, and upon receiving the answer signal from the first terminal, the first base station transmits the compressed sound signal, which is transmitted from the first terminal, and the non-sound signal, which is transmitted from the third terminal, to the second base station via the digital network by assigning the compressed sound signal to several bits of the channel and assigning the non-sound signal to remaining bits of the channel.

A second mobile telecommunication system according to the present invention is a mobile telecommunication system for transmitting a sound signal from a first terminal to a second terminal over a channel with a predetermined number of bits, each of said first and second terminal being a mobile telecommunication terminal, which comprises: a first base station to which the first terminal and a third terminal for transmitting a non-sound signal are connected, the first base station having a first modulation rate conversion device for converting a signal modulation rate; and a second base station connected to the first base station via a digital network, the second terminal being connected to the second base station, the second base station having a second modulation rate conversion device for converting a signal modulation rate, wherein the mobile telecommunication terminal comprises: means for coding and compressing the sound signal to convert the sound signal into a compressed sound signal; means for transmitting a first notice signal which informs that the first terminal is the mobile telecommunication terminal; and means for transmitting a control signal, which brings the first and second modulation rate conversion devices into a non-operational state, in response to receiving a second notice signal which informs that the second terminal is the mobile telecommunication terminal, and upon receiving the answer signal from the first terminal, the first base station transmits the compressed sound signal, which is transmitted from the first terminal, and the non-sound signal, which is transmitted from the third terminal, to the second base station via the digital network by assigning the compressed sound signal to several bits of the channel and assigning the non-sound signal to remaining bits of the channel.

A third mobile telecommunication system according to the present invention is a personal-handyphone-system transmission system for transmitting a sound signal from a first telecommunication terminal to a second telecommunication terminal via a circuit switching service of an integrated service digital network over a channel with a predetermined number of bits, which comprises: a first base station to which the first telecommunication terminal and a data terminal for transmitting a non-sound signal are connected, the first base station including a first adaptive-differential-pulse-code-modulation signal/pulse-code-modulation signal conversion device for converting an adaptive differential pulse code modulation signal, which is obtained by coding and compressing the sound signal according to an adaptive differential pulse code modulation scheme, into a pulse code modulation signal which is obtained by coding the sound signal according to a pulse code modulation; and a second base station connected to the first base station via said circuit switching service of the integrated service digital network, the second telecommunication terminal being connected to the second base station, the second base station including a second adaptive-differential-pulse-code-modulation signal/pulse-code modulation signal conversion device for converting the adaptive differential pulse code modulation signal into the pulse code modulation signal, wherein the first telecommunication terminal comprises: means for converting the sound signal into the adaptive differential pulse code modulation signal by coding and compressing the sound signal according to an adaptive differential pulse code modulation scheme; means for transmitting a first notice signal which informs that the first telecommunication terminal is a personal-handyphone-system terminal; and means for transmitting a control signal, which brings the first and second adaptive-differential-pulse-code-modulation signal/pulsecode-modulation signal conversion devices into a non-operational state, in response to receiving a second notice signal which informs that the second telecommunication terminal is a personal-handyphone-system terminal, and upon receiving the control signal from said first telecommunication terminal, the first base station transmits the adaptive differential pulse code modulation signal, which is transmitted from the first telecommunication terminal, and the non-sound signal, which is transmitted from the data terminal, to the second base station by assigning the adaptive differential pulse code modulation signal to several bits of the channel and assigning the non-sound signal to remaining bits of the channel.

DESCRIPTION OF THE PREFERRED EMBODIMENTS

Figure 1:
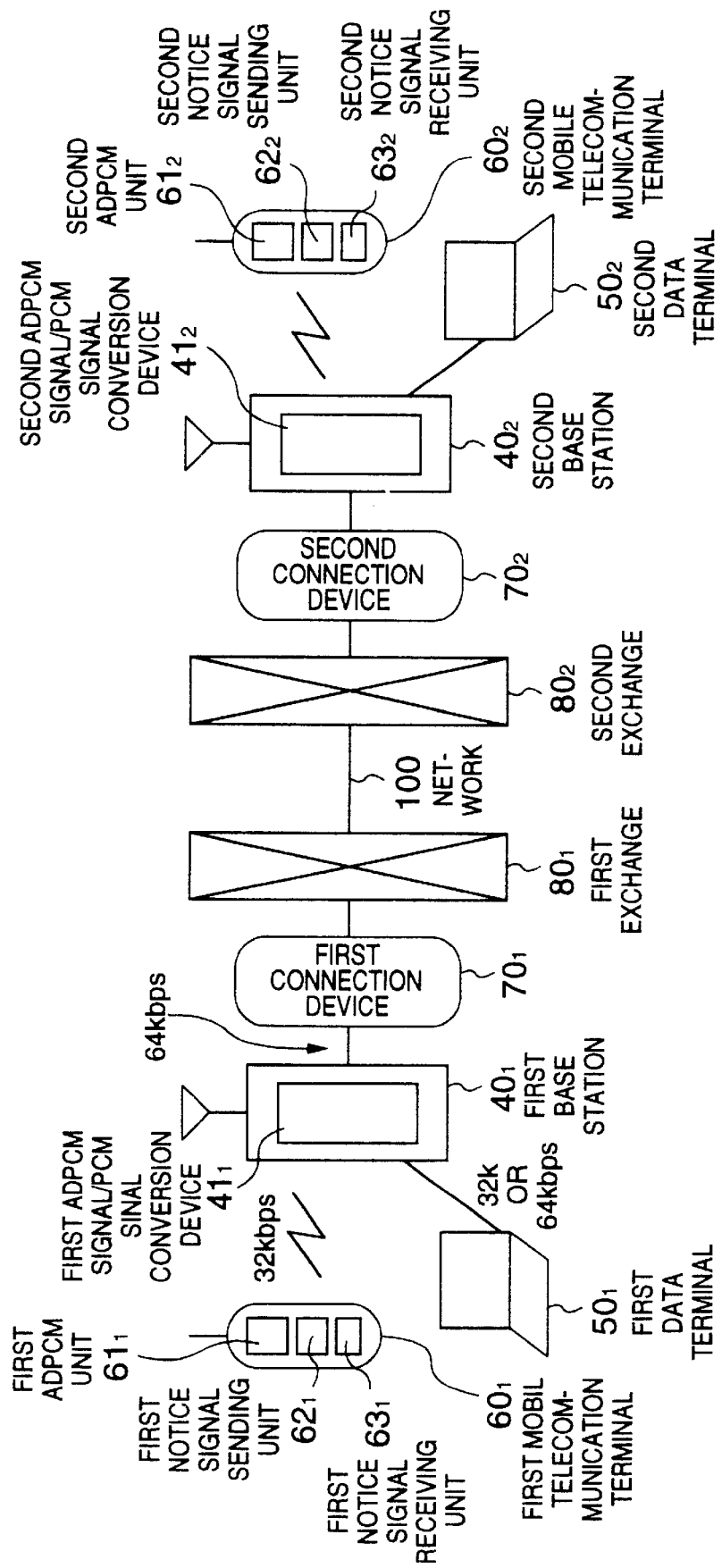
FIG. 1 is a block diagram showing the configuration a mobile telecommunication system according to an embodiment of the present invention.

As shown in FIG. 1, a mobile telecommunication system according to an embodiment of the present invention includes a first base station $40_1$ having a first ADPCM signal/PCM signal conversion device (modulation rate conversion device) $41_1$ and having a function of serving as a terminal adapter; a first data terminal $50_1$ with a communication rate equal to 32 kbps or 64 kbps; a first mobile telecommunication terminal $60_1$ communicating with the first base station $40_1$; a first connection device $70_1$ interconnected with the first base station $40_1$; and a first exchange $80_1$ interconnected with the first connection device $70_1$. The mobile telecommunication system further includes a second base station $40_2$ having a second ADPCM signal/PCM signal conversion device (modulation rate conversion device) $41_2$ and having a function of serving as a terminal adapter; a second data terminal $50_2$ with a communication rate equal to 32 kbps or 64 kbps; a second mobile telecommunication terminal $60_2$ communicating with the second base station $40_2$; a second connection device $70_2$ interconnected with the second base station $40_2$; and a second exchange $80_2$ interconnected with the second connection device $70_2$. The first exchange $80_1$ and the second exchange $80_2$ are interconnected via a network (digital network) 100.

The first and second ADPCM signal/PCM signal conversion devices $41_1$ and $41_2$ are disposed in the first and second base stations $40_1$ and $40_2$, respectively, and convert an ADPCM signal with a modulation rate of 32 kbps to a PCM (Pulse Coded Modulation) signal with a modulation rate of 64 kbps.

The first and second mobile telecommunication terminals $60_1$ and $60_2$ include first and second ADPCM units $61_1$ and $61_2$ first and second notice signal transmitting units $62_1$ and $62_2$, and first and second notice signal receiving units $63_1$ and $63_2$, respectively. Here, each of the first and second ADPCM units $61_1$ and $61_2$ conducts the adaptive-differential-pulse-code-modulation on a sound signal to convert the sound signal to the ADPCM signal (compressed sound signal) of 32 kbps. The first notice signal transmitting unit $62_1$ transmits a first notice signal which informs to an other-party terminal (the second mobile telecommunication terminal $60_2$) at the time of call originating that the first mobile telecommunication terminal $62_1$ is a mobile telecommunication terminal. Similarly, the second notice signal transmitting unit $62_2$ transmits a second notice signal which informs to an other-party terminal (the first mobile telecommunication terminal $60_1$) at the time of call originating that the second mobile telecommunication terminal $62_2$ is a mobile telecommunication terminal. Upon receiving the second notice signal informing that the other-party terminal (the second mobile telecommunication terminal $60_2$) is a mobile telephone terminal at the time of receiving, the first notice signal receiving unit $63_1$ transmits to the first base station $40_1$ as an answer signal a first control signal which brings the first and second ADPCM signal/PCM signal conversion devices $41_1$ and $41_2$ into a data through mode (non-operational state). Similarly, upon receiving the first notice signal informing that the other-party terminal (the first mobile telecommunication terminal $60_1$) is a mobile telephone terminal at the time of receiving, the second notice signal receiving unit $63_2$ transmits to the second base station $40_2$ as an answer signal a second control signal which brings the first and second ADPCM signal/PCM signal conversion devices $41_1$ and $41_2$ into the data through mode.

The first and second base stations $40_1$ and $40_2$ are connected to the first and second mobile telecommunication terminals $60_1$ and $60_2$ by radio, respectively and are connected to the first and second data terminals $50_1$ and $50_2$ by wire, respectively.

Hereafter, the operation of the mobile telecommunication system according to the present embodiment thus configured will be described.

In the case where the first mobile telecommunication terminal $60_1$ communicates with the second mobile telecommunication terminal $60_2$, the first mobile telecommunication terminal $60_1$ recognizes the other-party terminal (the second mobile telecommunication terminal $60_2$) as a mobile telecommunication terminal on the basis of the second notice signal transmitted from the second mobile telecommunication terminal $60_2$. Upon recognizing the other-party terminal as a mobile telephone terminal, the first mobile telecommunication terminal $60_1$ recognizes that the other-party terminal receives the sound signal as the ADPCM signal of 32 kbps instead of as the PCM signal of 64 kbps, and transmits to the first base station $40_1$ the first control signal for bringing the first and second ADPCM signal/PCM signal conversion devices $41_1$ and $41_2$ in the first and second base stations $40_1$ and $40_2$ into the data through mode. Therefore, the ADPCM signal of 32 kbps transmitted from the first mobile telecommunication terminal $60_1$ is transmitted to the second mobile telecommunication terminal $60_2$ via the first connection device $70_1$, the first exchange $80_1$, the network 100, the second exchange $80_2$, the second connection device $70_2$, and the second base station $40_2$ without being converted into the PCM signal of 64 kbps in the first ADPCM signal/PCM signal conversion device $41_1$.

Figure 2A:
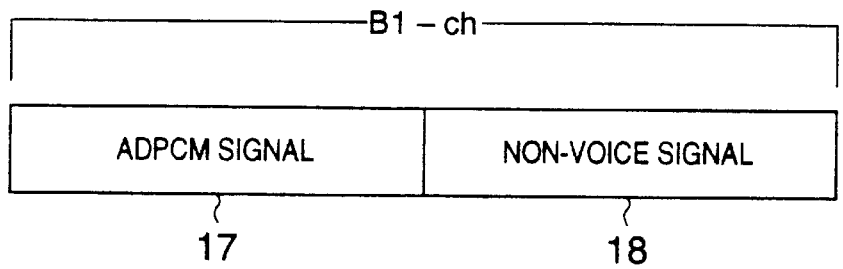
FIGS. 2A and 2B are diagrams showing the relation between a B channel and an ADPCM signal and a non-sound signal in the mobile telecommunication system according to the embodiment of the present invention.
Figure 2B:
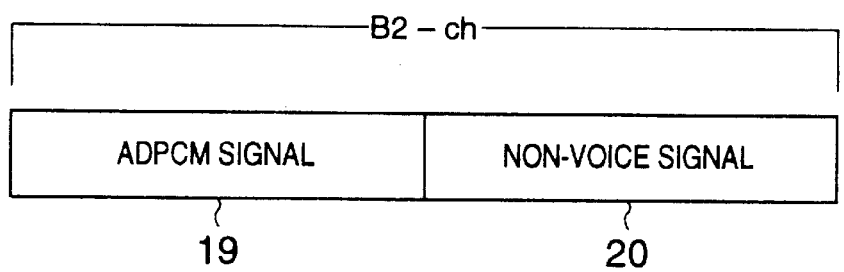
Figure 3A:
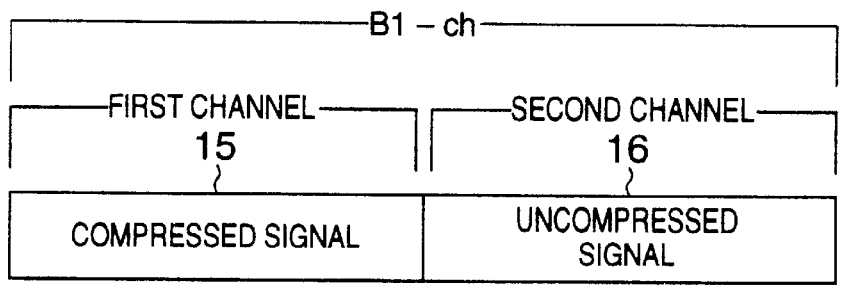
FIGS. 3A and 3B are diagrams showing the principle configuration in a conventional PHS transmission system.
Figure 3B:
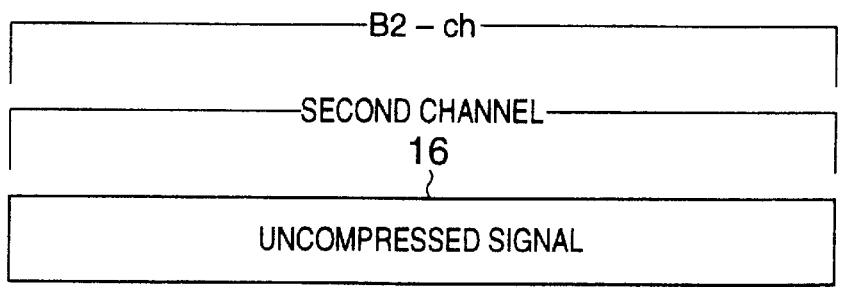

In the ISDN network corresponding to the PCM signal of 64 kbps, it is possible to assign an ADPCM signal 17 to four bits among eight bits of B1 channel (B1-ch) and a non-sound signal 18 to four remaining bits, as shown in FIG. 2A. Furthermore, it is possible to assign an ADPCM signal 19 to four bits among eight bits of B2 channel (B2-ch) and a non-sound signal 20 to four remaining bits, as shown in FIG. 2B.

By using one channel (B1 channel or B2 channel), therefore, it is possible to transmit the ADPCM signal from the first mobile telecommunication terminal $60_1$ to the second mobile telecommunication terminal $60_2$ as a signal of 32 kbps and to simultaneously therewith transmit a data signal (non-sound signal) from the first data terminal $50_1$ to the second data terminal $50_2$ as a signal of 32 kbps. Furthermore, in the case where the first and second mobile telecommunication terminals $60_1$ and $60_2$ are not used, data signal communication can be conducted between the first data terminal $50_1$ and the second data terminal $50_2$ as a signal of 64 kbps by using the B1 channel or the B2 channel.

On the other hand, upon recognizing that the other-party terminal is not a mobile telecommunication terminal, the first mobile telecommunication terminal $60_1$ recognizes that the other-party terminal receives the sound signal as the PCM signal of 64 kbps instead of as the ADPCM signal of 32 kbps, and does not transmit to the first base station $40_1$ the first control signal for bringing the first and second ADPCM signal/PCM signal conversion devices $41_1$ and $41_2$ into the data through mode. As a result, the ADPCM signal of 32 kbps transmitted from the first mobile telecommunication terminal $60_1$ is converted into the PCM signal of 64 kbps in the first ADPCM/PCM conversion device $41_1$ and then the converted PCM signal is transmitted from the first base station $40_1$ to the second mobile telecommunication terminal $60_2$ via the first connection device $70_1$, the first exchange $80_1$, the network 100, the second exchange $80_2$, the second connection device $70_2$, and the second base station $40_2$.

The first connection device $70_1$ has such a configuration as to be able to accommodate a plurality of radio base stations. Each radio base station is connected to the first exchange $80_1$ via the first connection device $70_1$. The second connection device $70_2$ also has a configuration similar to that of the first connection device $70_1$.

What is claimed is:

1. A mobile telecommunication system for transmitting a sound signal from a first terminal to a second terminal over two channels each comprising a predetermined number of bits, each of said first and second terminals being a mobile telecommunication terminal, said system comprising:

a first base station to which said first terminal and a third terminal for transmitting a non-sound signal are connected; and a second base station connected to said first base station via a digital network, said second terminal being connected to said second base station, wherein said first terminal comprises:

means for coding and compressing said sound signal to convert said sound signal into a compressed sound signal; and means for transmitting an answer signal in response to receiving a notice signal which informs that said second terminal is the mobile telecommunication terminal, and upon receiving said answer signal from said first terminal, said first base station transmits said compressed sound signal, which is transmitted from said first terminal, and said non-sound signal, which is transmitted from said third terminal, to said second bass station via said digital network by assigning said compressed sound signal to several bits of one channel of said two channels and several bits of the other channel of said two channels and assigning said non-sound signal to remaining bits of said one channel and remaining bits of said other channel.

2. A mobile telecommunication system according to claim 1, wherein
said mobile telecommunication system is a personal-handyphone-system transmission system, and
said compressed sound signal is an adaptive-differential-pulse-code-modulation signal produced by coding and compressing said sound signal according to an adaptive differential pulse code modulation scheme.

3. A mobile telecommunication system according to claim 2, wherein said adaptive-differential-pulse-code-modulation signal has a modulation rate of 32 kbps.

4. A mobile telecommunication system for transmitting a sound signal from a first terminal to a second terminal over two channels each comprising a predetermined number of bits, each of said first and second terminal being a mobile telecommunication terminal, said system comprising:

a first base station to which said first terminal and a third terminal for transmitting a non-sound signal are connected, said first base station having a first modulation rate conversion device for converting a signal modulation rate; and a second base station connected to said first base station via a digital network, said second terminal being connected to said second base station, said second base station having a second modulation rate conversion device for converting a signal modulation rate, wherein said mobile telecommunication terminal comprises:

means for coding and compressing said sound signal to convert said sound signal into a compressed sound signal;

means for transmitting a first notice signal which informs that said first terminal is the mobile telecommunication terminal; and means for transmitting a control signal, which brings said first and second modulation rate conversion devices into a non-operational state, in response to receiving a second notice signal which informs that said second terminal is the mobile telecommunication terminal, and upon receiving said answer signal from said first terminal, said first base station transmits said compressed sound signal, which is transmitted from said first terminal, and said non-sound signal, which is transmitted from said third terminal, to said second base station via said digital network by assigning said compressed sound signal to several bits of one channel of said two channels and several bits of the other channel of said two channels and assigning said non-sound signal to remaining bits of said one channel and remaining bits of said other channel.

5. A mobile telecommunication system according to claim 4, wherein
said mobile telecommunication system is a personal-handyphone-system transmission system, and
said compressed sound signal is an adaptive differential pulse code modulation signal produced by coding and compressing said sound signal according to an adaptive differential pulse code modulation scheme, and
each of said first and second modulation rate conversion devices converts an modulation rate of said adaptive differential pulse code modulation signal to produce a pulse code modulation signal which is obtained by coding said sound signal according to a pulse code modulation scheme.

6. A mobile telecommunication system according to claim 5, wherein
said adaptive differential pulse code modulation signal has a modulation rate of 32 kbps, and
said pulse code modulation signal has a modulation rate of 64 kbps.

7. A personal-handphone-system transmission system for transmitting a sound signal from a first telecommunication terminal to a second telecommunication terminal via a circuit switching service of an integrated service digital network over two channels each comprising a predetermined number of bits, said system comprising:

a first base station to which said first telecommunication terminal and a data terminal for transmitting a non-sound signal are connected, said first base station including a first adaptive-differential-pulse-code-modulation signal/pulse-code-modulation signal conversion device for converting an adaptive differential pulse code modulation signal, which is obtained by coding and compressing said sound signal according to an adaptive differential pulse code modulation scheme, into a pulse code modulation signal which is obtained by coding said sound signal according to a pulse code modulation; and a second base station connected to said first base station via said circuit switching service of said integrated service digital network, said second telecommunication terminal being connected to said second base station, said second base station including a second adaptive-differential-pulse-code-modulation signal/pulse-code-modulation signal conversion device for converting said adaptive differential pulse code modulation signal into said pulse code modulation signal, wherein said first telecommunication terminal comprises:

means for converting said sound signal into said adaptive differential pulse code modulation signal by coding and compressing said sound signal according to an adaptive differential pulse code modulation scheme;

means for transmitting a first notice signal which informs that said first telecommunication terminal is a personal-handphone-system terminal; and means for transmitting a control signal, which brings said first and second adaptive-differential-pulse-code-modulation signal/pulse-code-modulation signal conversion devices into a non-operation state, in response to receiving a second notice signal which informs that said second telecommunication terminal is a personal-handphone-system terminal, and upon receiving said control signal from said first telecommunication terminal, said first base station transmits said adaptive differential pulse code modulation signal, which is transmitted from said first telecommunication terminal, and said non-sound signal, which is transmitted from said data terminal, to said second bass station by assigning said adaptive differential pulse code modulation signal to several bits of one channel of said two channels and several bits of the other channel of said two channels and assigning said non-sound signal to remaining bits of said one channel and remaining bits of said other channel.

8. A mobile telecommunication system according to claim 7, wherein said adaptive differential pulse code modulation signal has a modulation rate of 32 kbps, and said pulse code modulation signal has a modulation rate of 64 kbps.

* * * * *